Patented Nov. 26, 1935

2,022,331

UNITED STATES PATENT OFFICE 2,022,331

LACQUER

Melville M. Wilson, Philadelphia, Pa., assignor to The Sharples Solvents Corporation, Philadelphia, Pa., a corporation of Delaware No Drawing. Application February 10, 1933, Serial No. 656,148

3 Claims. (Cl. 134—26)

The present invention relates to the production of a new composition of matter adapted to be used as a lacquer. More specifically, it involves the use of an oil-soluble condensation product of an alkyl-substituted phenol with a methylene containing body as a lacquer ingredient. It has been known heretofore that certain alkyl-substituted phenols yield oil-soluble resins when condensed with methylene containing bodies such as formaldehyde, this fact having been set forth in German Patent No. 340,989 of May 4, 1919. In the third paragraph of this patent, the oil solubility of such a resin formed from the alkyl-substituted phenol produced by the condensation of iso-amylene with phenol; i. e. tertiary amyl phenol, is suggested. The present invention consists in compounding a lacquer using this oil-soluble condensation product as its resinous ingredient. It involves the discovery that when such a tertiary amyl phenol-formaldehyde resin is combined with the proper solvents and diluents, it is possible to compound a lacquer in which the resinous body is completely compatible with the cellulose nitrate contained in the lacquer and that by mixing the ingredients in accordance with the invention, a lacquer is produced which is free from blush upon drying.

When a solution of an oil-soluble alkyl substituted phenol-formaldehyde resin is dissolved in a suitable solvent mixture including, for example, toluene and amyl acetate, and the resin solution is mixed with a nitrocellulose solution, the resulting mixture may be cloudy. The solution may be clarified by the addition of a small amount of higher boiling alcohol. In this connection, the use of a monohydric alcohol containing from four to six carbon atoms is preferred. Upon drying, however, the lacquer compounded from these ingredients forms an objectionably cloudy film. The cloudiness of the film may be somewhat reduced by the careful regulation of the amount of alcohol added, but it cannot be entirely eliminated.

In accordance with the present invention, a small amount of dialkyl phthalate is added to the lacquer compounded from the nitrocellulose and resin solutions. When dibutyl phthalate, for example, is added to such a lacquer in carefully proportioned quantities, the lacquer will produce a film which possesses only a very slight trace of cloudiness.

It has been discovered that a lacquer which is capable of producing an entirely cloudless film may be compounded by the addition of a small amount of ester gum to a lacquer containing an alkyl substituted phenolic condensation product and dialkyl phthalate, such as that suggested above. The best results have been obtained in this connection by the addition of a quantity of ester gum substantially equal to the amount of resin present. In any case the amount of ester gum added to the mixture should be at least two-thirds of the amount of resin present in order to obtain the best results.

It has also been discovered that a "Glyptal" resin solution may be substituted for the ester gum in the lacquer with good results. Thus, where the lacquer involves a solution containing "Glyptal" and dibutyl phthalate in substantially equal amounts, a cloudless film can be produced. The following examples illustrate the invention:

*Example 1.*—A solution was made consisting of the following:

50 grams of para-tertiary amyl phenol resin
50 c. c. of toluol
50 c. c of amyl acetate.

This solution was mixed in equal volume with a nitrocellulose solution consisting of 70 grams of half second nitrocellulose
30 c. c. of ethyl alcohol
200 c. c. of toluol
100 c. c. of ethyl acetate
100 c. c. of amyl acetate.

The resulting mixture was cloudy. Upon the addition of 10 c. c. of amyl alcohol, however, the mixture cleared up. When this lacquer was applied to a surface to be coated, it deposited a cloudy film upon drying. When increasing amounts of amyl alcohol were added to the lacquer up to a total limit of 30 c. c., films deposited upon application of the lacquer to a surface to be coated were more clear than those obtained with smaller amounts of amyl alcohols, but never became absolutely clear. Finally 5 c. c. of dibutyl phthalate were added to the solution and the resulting mixture produced a film which was more nearly clear than any of the others.

*Example 2.*—20 grams of the resin solution of Example 1 were mixed with 46 grams of the nitrocellulose solution in that example to form a homogeneous, clear composition. 30 c. c. of amyl alcohol were gradually added to the lacquer mixture and 5 c. c. of dibutyl phthalate were then gradually added. The resulting lacquer produced a film which was only very slightly cloudy.

*Example 3.*—10 grams of the resin solution of Example 1 were mixed with 46 grams of the nitrocellulose solution and 3½ grams of ester gum and 20 c. c. of amyl alcohol. These solutions gave films which exhibited a slight degree of cloudiness. Finally 5 c. c. of dibutyl phthalate were added. The resulting lacquer produced a film which exhibited practically no cloudiness whatever.

*Example 4.*—A solution was made consisting of the following:

5 grams of ester gum
    5 grams of tertiary amyl phenol resin
    10 grams of half second nitrocellulose
    4 c. c. of ethyl alcohol
    50 c. c. of toluol
    20 c. c. of ethyl acetate
    30 c. c. of butyl acetate.

15 c. c. of butanol were added to this solution in increments and finally 3 c. c. of dibutyl phthalate were added. The resulting lacquer produced a clear film.

*Example 5.*—A solution was made consisting of the following:

9 grams of tertiary amyl phenol resin
    7 grams of ester gum
    10 grams of half second nitrocellulose
    4 c. c. of ethyl alcohol
    50 c. c. of toluol
    30 c. c. of ethyl acetate
    20 c. c. of amyl acetate.

15 c. c. of amyl alcohol were added in increments and 3 c. c. of dibutyl phthalate were finally added to the mixture. The resulting lacquer produced a clear film.

*Example 6.*—A solution was made consisting of the following:

12 grams of a 40% "Glyptal" resin solution
    5 grams of tertiary amyl phenol resin
    10 grams of half second nitrocellulose
    4 c. c. of ethyl alcohol
    50 c. c. of toluol
    20 c. c. of ethyl acetate
    30 c. c. of butyl acetate
    5 c. c. of amyl alcohol.

3 c. c. of dibutyl phthalate were finally added. The resulting film was relatively free from cloudiness but was not as satisfactory as that produced by the lacquers including the ester gum as ingredients.

The term "Glyptal" resin has been used throughout the specification to designate polyhydric alcohol-polybasic acid resins.

What I claim is:

1. A lacquer comprising an oil soluble resinous condensation product formed from tertiary amyl phenol and a methylene containing body, a hydrocarbon oil containing vehicle, a cellulose ester, a relatively small quantity of dialkyl phthalate and a quantity of a resin of the class consisting of ester gum and polyhydric alcohol-polybasic acid resins, which quantity is equal to at least two-thirds of the quantity of condensation product present.

2. A lacquer comprising an oil soluble resinous condensation product formed from teritiary amyl phenol and a methylene containing body, a hydrocarbon oil containing vehicle, a cellulose ester, a relatively small quantity of dibutyl phthalate and a quantity of ester gum equal to at least two-thirds of the quantity of condensation product present.

3. A lacquer of approximately the following composition:

| | |
|---|---|
| Tertiary amyl phenol-formaldehyde resin | 5 grams |
| Nitrocellulose (half second) | 10 grams |
| Ester gum | 5 grams |
| Ethyl alcohol | 4 c. c. |
| Toluol | 50 c. c. |
| Ethyl acetate | 20 c. c. |
| Butyl acetate | 30 c. c. |
| Butanol | 15 c. c. |
| Dibutyl phthalate | 3 c. c. |

MELVILLE M. WILSON.